United States Patent
Brothers

(10) Patent No.: US 11,427,710 B2
(45) Date of Patent: Aug. 30, 2022

(54) COMPOSITIONS HAVING REDUCED TACK AND ARTICLES MADE THEREOF

(71) Applicant: Kraton Polymers LLC, Houston, TX (US)

(72) Inventor: Aaron Brothers, Houston, TX (US)

(73) Assignee: KRATON POLYMERS LLC, Houston, TX (US)

( * ) Notice: Subject to any disclaimer, the term of this patent is extended or adjusted under 35 U.S.C. 154(b) by 148 days.

(21) Appl. No.: 16/826,787

(22) Filed: Mar. 23, 2020

(65) Prior Publication Data

US 2020/0317922 A1 Oct. 8, 2020

Related U.S. Application Data

(60) Provisional application No. 62/830,597, filed on Apr. 8, 2019.

(51) Int. Cl.
| | | |
|---|---|---|
| *C08L 91/00* | (2006.01) | |
| *B29C 43/00* | (2006.01) | |
| *B29C 43/02* | (2006.01) | |
| *B29C 45/00* | (2006.01) | |
| B29K 25/00 | (2006.01) | |
| B29K 105/00 | (2006.01) | |
| B29K 509/08 | (2006.01) | |

(52) U.S. Cl.
CPC ............ *C08L 91/00* (2013.01); *B29C 43/003* (2013.01); *B29C 43/02* (2013.01); *B29C 45/0001* (2013.01); *B29C 45/0013* (2013.01); B29K 2025/08 (2013.01); B29K 2105/0061 (2013.01); B29K 2509/08 (2013.01); B29K 2995/0098 (2013.01); *C08L 2205/03* (2013.01); *C08L 2205/06* (2013.01)

(58) Field of Classification Search
CPC .. C08L 91/00; C08L 2205/03; C08L 2205/06; B29C 45/0001; B29C 43/003; B29C 43/02; B29C 45/0013; B29K 2105/0061
USPC .......................................................... 524/62
See application file for complete search history.

(56) References Cited

U.S. PATENT DOCUMENTS

| | | | |
|---|---|---|---|
| 5,760,117 A * | 6/1998 | Chen ...................... | C08L 53/00 524/226 |
| 6,117,495 A | 9/2000 | Hanson et al. | |
| 7,001,956 B2 | 2/2006 | Handlin, Jr. et al. | |
| 7,157,521 B2 * | 1/2007 | Wang ...................... | C09K 3/10 525/240 |
| 7,166,672 B2 | 1/2007 | Handlin, Jr. et al. | |
| 7,220,798 B2 | 5/2007 | Atwood et al. | |
| 7,625,979 B2 | 12/2009 | Atwood et al. | |
| 2004/0249056 A1 | 12/2004 | Chen | |
| 2005/0008669 A1 | 1/2005 | Chen | |
| 2007/0197949 A1 | 8/2007 | Chen | |
| 2015/0219796 A1* | 8/2015 | Salazar .................. | G02B 1/046 385/109 |

\* cited by examiner

*Primary Examiner* — Hui H Chin

(57) ABSTRACT

A oil gel composition, consisting essentially of: 65-80 wt. % of a mineral oil, 15-25 wt. % of a hydrogenated styrenic block copolymer (HSBC), 1 to 15 wt. % of glass spheres having an average particle size of at least 15 microns, 1 at least 50 wt. % of a plasticizer selected from mineral oil, a paraffinic oil, an oil-enriched in paraffin, and mixtures thereof, and 0.25-5 wt. % of a tack reducing component selected from the group of steric acid, metal stearates, long chain fatty acids, fatty acid salts, fatty acid esters, amide waxes, ethylene-bis-stearamides, erucamide, polyester modified siloxanes, and mixtures thereof. The oil gel composition has an average peel strength of less than 0.3 lbf/in measured according to ASTM D 1876. Articles formed from the oil gel composition are characterized as being tack-free.

18 Claims, No Drawings

COMPOSITIONS HAVING REDUCED TACK AND ARTICLES MADE THEREOF

RELATED APPLICATIONS

This application claims priority from U.S. Provisional Application No. 62/830,597, with a filing date of Apr. 8, 2019, the entire disclosure is incorporated herein by reference.

FIELD

This disclosure relates to an oil gel composition with reduced tack, methods for preparation, and articles made thereof.

BACKGROUND

Oil gel compositions are primarily composed of an oil and a hydrogenated styrene-butadiene copolymer (SBS) triblock or styrene-ethylene-butylene-styrene (SEBS). These oil gels generally exhibit surface tack on molded or extruded articles. Tack is problematic because it can produce undesirable haptics (tackiness/stickiness) and/or undesirable surface appearance in articles, making it difficult to handle finished goods made out of such materials.

Tack can be reduced by applying a fine powder of starch or dust on the surface of a processed article, or the application of a particulate or powder into the mold to form a barrier between mold surface and the formed article. U.S. Pat. No. 6,117,495 discloses a method for forming a mold-release coating with a base coat of material on the mold surface, followed by electrostatically depositing a release powder onto the base coat of material. The base coat may be a wax or solvent base wax. The coating or dusting step can increase manufacturing complexities. Further, the powder can come off the finished article later during usage and/or handling.

There is a need to reduce tack in articles made from oil gel compositions with minimal dusting. or without the need of a dusting step or other post processing measures.

SUMMARY

In one aspect, a molded article is disclosed. The article is molded from an oil gel composition consisting essentially of: 10-40 wt. % of a hydrogenated styrenic block copolymer (HSBC), having a general formula of A-B, A-B-A, A-B-A-B, (A-B-A)nX, (A-B)nX, or mixtures thereof, where each A block is a mono alkenyl arene polymer, each B block is a conjugated diene, n is an integer from 2 to 30, and X is a coupling agent residue; up to 15 wt. % of a filler; at least 50 wt. % of a plasticizer selected from mineral oil, a paraffinic oil, an oil-enriched in paraffin, and mixtures thereof; 0.25-5 wt. % of a tack reducing component selected from the group of steric acid, metal stearates, long chain fatty acids, fatty acid salts, fatty acid esters, amide waxes, ethylene-bis-stearamides, erucamide, polyester modified siloxanes, and mixtures thereof; wherein the molded article in a process without additional application of an external mold release surface coating or a powder coating has an average peel strength of less than 53 N/m (0.3 lbf/in) according to modified ASTM D 1876.

In another aspect, a method for forming a molded article from a hydrogenated styrenic block copolymer (HSBC), without application of any external mold release surface coating or a powder coating on a surface of the mold, is disclosed.

DESCRIPTION

The following terms are used in the specification and will have the following meanings:

Unless otherwise specified, "Molecular weight" or MW refers to the styrene equivalent molecular weight in g/mol of a polymer block or a block copolymer. MW can be measured with gel permeation chromatography (GPC) using polystyrene calibration standards, such as is done according to ASTM 5296-19. The chromatograph is calibrated using commercially available polystyrene molecular weight standards. MW of polymers measured using GPC so calibrated are styrene equivalent molecular weights. The styrene equivalent molecular weight can be converted to true molecular weight when the styrene content of the polymer and the vinyl content of the diene segments are known. The detector can be a combination ultraviolet and refractive index detector. MW expressed herein is measured at the peak of the GPC trace, converted to true molecular weights, and are commonly referred to as "peak molecular weights", designated as $M_p$. Unless converted to true molecular weights, as described above, the MW or molecular weight herein refers to the styrene equivalent peak molecular weights.

"Solid" as referring to the oil gel composition means the composition is firm and stable in shape, e.g., an elastic gel.

Surface tack, stickiness, and tackiness are used interchangeably throughout the specification, and refers to a condition when a molded or extruded article made is sticky and/or adhesive.

"Peel strength" is measure of the relative peel resistance of adhesive bonds between flexible adherends by means of a T-type specimen, and can be measured using a modified ASTM D 1876 T-Peel test method.

"Modified ASTM D 1876-08 T-Peel test method" refers to a standard test method for peel resistance test of adhesives with the modification being the test specimen being modified to be 1 inch wide and 4 inch long non-laminated sample and the load speed applied being 12 in/min.

A reference to peel strength refers to peel strength measurement made with Modified ASTM D 1876-08 T-Peel test method, and after the sample is conditioned for 24 hours under 0.62 lb/in² pressure.

"Tack free" or "substantially tack free" in the context of a molded or extruded article means the article has an average peel strength less than 53 N/m (0.3 lbf/in). A tack free article typically does not display any perceived tack when subject to a thumb test, or that the article does not stick to or adhere to another article molded or formed of the same composition when the two articles are manually pressed together.

"Vinyl content" refers to the content of a conjugated diene that is polymerized via 1,2-addition in the case of butadiene, or via 3,4-addition in case of isoprene.

Polystyrene content or PSC of a block copolymer refers to the % weight of polystyrene in the block copolymer, calculated by dividing the sum of molecular weight of all polystyrene blocks by the total molecular weight of the block copolymer. PSC can be determined using proton nuclear magnetic resonance (NMR).

"Dropping point" in the context of a tack-reducing agent, or a lubricating grease is the temperature at which it passes from a semi-solid to a liquid as defined by ASTM-127, as an indication of the heat resistance of the grease.

This disclosure provides compositions for producing molded or extruded articles having less surface tack, with minimal dusting or without the need for dusting. The composition comprises a styrenic block copolymer, oil, a tack reducing component, and optional additives.

Styrenic Block Copolymer:

The block copolymer is a hydrogenated styrenic block copolymer (HSBC), having a general formula A-B, A-B-A, A-B-A-B, (A-B-A)nX, (A-B)nX, or mixtures thereof, where each A block is a mono alkenyl arene polymer, each B block is a conjugated diene, n is an integer from 2 to 30, and X is a coupling agent residue. Prior to hydrogenation, each A block can have a peak molecular weight from 3,000-60,000 g/mole, and each B block can have a peak molecular weight from 30,000-300,000 g/mole, and a vinyl content from 25-85 mole percent. After hydrogenation, at least 90 mole percent of the double bonds in the B block, and from 0-10 mole percent of the polymerized mono alkenyl arene units are reduced.

In embodiments, the HSBC has a mono alkenyl arene content from 20-80 wt. %, or 30-70 wt. %, or 25-35 wt. %, relative to the overall weight of the HSBC. Preferred mono alkenyl arenes include styrene, α-methylstyrene, o-methylstyrene, p-methylstyrene, or mixtures thereof, preferably styrene.

The conjugated diene is 1,3-butadiene, isoprene or mixtures thereof, preferably 1,3-butadiene. In embodiments, the HSBC comprises one or more of the linear block copolymers, A-B, A-B-A, and A-B-A-B in any relative proportion, or one or more of the coupled or radial block copolymers, (A-B-A)nX and (A-B)nX in any relative proportion. Further, the HSBC can also comprise one or more of the linear block copolymers and one or more of the radial block copolymers in any relative proportion.

In embodiments, the HSBC is one or a mixture of more than one hydrogenated styrene-butadiene-styrene (SBS) block copolymers, represented by the formula S-E/B—S, where E/B denotes the hydrogenated polybutadiene block and is composed of polymerized ethylene (E) and butylene (B) units.

In embodiments, the HSBC is a coupled block copolymer composition comprising (a) a linear diblock copolymer (I) represented by the general formula (A-B), having a styrene equivalent peak molecular weight of from 100,000 to 400,000, (b) a linear di-armed block copolymer (II), represented by the general formula (A-B)2X, (c) a tri-armed block copolymer (III), represented by the formula (A-B)3X, (d) a more than tri-armed block copolymer (IV), represented by the formula (A-B)n>3X, (e) side polymeric structures (SPS) having a styrene equivalent peak molecular weight below the linear diblock copolymer (I), where A represents a block of predominantly poly(monovinyl aromatic hydrocarbon) and wherein the poly(monovinyl aromatic hydrocarbon) content is in the range of from 20 to 35 wt %; B represents a block of predominantly poly(conjugated diene); wherein X is the residue of a trifunctional and/or tetrafunctional coupling agent. The HSBC has a styrene equivalent peak molecular weight in the range of from 200,000 to 800,000, with the relative amounts of block copolymers corresponds 5 to 15 wt % I; II and III together are from 70 to 90 wt %, III is above 10 wt %; IV is below 10 wt % and SPS is less than 10 wt %, relative to the weight of the total block copolymer composition, in which the respective components add up to 100%

In embodiments, the HSBC composition comprises: a tetra-branched block copolymer (IV) having a styrene equivalent peak molecular weight of 100,000 to 800,000 represented by the general formula (A-B)$_4$X; a tri-branched block copolymer (III) having a styrene equivalent peak molecular weight of from 75,000 to 600,000 represented by the general formula (A-B)$_3$X; a di-branched block copolymer (II) having a styrene equivalent peak molecular weight of from 50,000 to 400,000 represented by the general formula (A-B)$_2$X; and a linear diblock copolymer (I) having a styrene equivalent peak molecular weight of from 25,000 to 200,000 represented by the general formula A-B; where: A represents a polymer block of a mono alkenyl arene; B represents a polymer block of a conjugated diene selected from the group consisting essentially of butadiene and mixtures of isoprene and butadiene; X represents the residue of an alkoxy silane coupling agent having the formula Rx-Si—(OR')y, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and wherein the relative amounts of copolymers I, II, III and IV are from 0 to 5 weight percent IV, from 0 to 60 weight percent III, from 40 to 95 weight percent II and from 2 to 10 weight percent I, where the total of I, II, III and IV equals 100 weight percent.

HSBCs can be prepared by methods known in the art as disclosed in U.S. Pat. No. 7,592,390, incorporated herein by reference. Examples of representative HSBC includes Septon 4055, a high MW SEEPS tri-block copolymer from Kuraray, as described in U.S. Pat. No. 5,994,450, incorporated herein by reference, and KRATON E1830 from Kraton Corp., as described in U.S. Pat. Nos. 7,625,979, 7,001,956, 7,166,672, and 7,220,798, incorporated herein by reference.

The styrenic block copolymer component is present in the oil gel composition in an amount of 10-35 wt %, or 15-25 wt. %; or 19-21 wt. %, based on the total weight of the oil gel composition.

Tack Reducing Component:

The oil gel composition comprises at least a tack reducing or anti-tacking agent. Examples include but are not limited to fatty stearate salts, steric acid or metal stearates such as aluminum stearate, barium stearate, calcium stearate, lithium stearate, potassium stearate, sodium stearate, strontium stearate, zinc stearate, and magnesium stearate.

In embodiments, the tack reducing components include long chain fatty acids, fatty acid salts, fatty acid esters, amide waxes and mixtures of fatty acids, amines and esters. In embodiments, the tack-reducing agent is a lubricating grease, having a dropping point of at least 65° C., or at least 75° C., or at least 80° C., or at least 100° C., or less than 130° C. In embodiments, the tack reducing agent is a lubricant selected from ethylene-bis-stearamides, erucamide, and polyester modified polysiloxanes.

The tack reducing component is present in the oil gel composition in an amount of 0.25-5 wt. %, or 0.5-3 wt. %, or 1-2 wt. %, based on the total weight of the oil gel composition.

Plasticizer Component:

The oil gel composition comprises a dispersion aid or a plasticizer, selected from aliphatic hydrocarbon based oils, fatty acids, triglyceride oils, and mixtures thereof. Examples include fatty oils (mixtures of animal or vegetable fatty acid triglycerides), mineral oils, and silicon oils.

In embodiments, the oil is selected from a mineral oil, a paraffinic oil, an oil-enriched in paraffin, and mixtures thereof. In some embodiments, the oil is a GTL-based process oil (or Fischer-Tropsch oil). In embodiments, the oil is a synthetic oil. In embodiments, the oil comprises diesel, biodiesel and carboxylic acid esters such as 2-ethylhexyl oleate.

The oil gel composition comprises 60-90 wt. % oil, or 65-85 wt % oil, or from 70-80 wt. % oil, based on the total weight of the oil gel composition.

Filler Materials:

The oil gel composition also contains at least a filler material, The filler material can be natural or synthetic in origin, but are generally expected to be synthetically produced material. Depending on the filler, adding a filler may increase the toughness and impact strength of the polymeric composition while also lowering the material cost for producing articles.

Non-limited examples of inorganic fillers include iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, calcium phosphate, magnesium phosphate, talc, mica, kaolin, clay, wollastonite, hydrotalcite, glass powders, spheres, silica sand, silica rock, silicon nitride, quartz powder, volcanic pumice, diatomaceous earth, iron powder and aluminum powder. In some embodiments, the inorganic filler is calcium carbonate, talc, or mixtures thereof.

In addition to glass, other examples include microspheres formed from polymer materials, such as a polyolefin, particularly an acrylonitrile copolymer or polyvinylchloride. In addition to the synthetic microspheres, other types of hollow materials having various geometries can also be used, tubular, rectangular, or other geometric shapes.

In embodiments, the oil gel composition comprises glass microspheres as fillers. Examples of glass spheres include hollow spheres, synthetic microspheres, mineral particles, glass beads, and mixtures thereof, having an average diameter of 0.05 mm to 15 mm. In embodiments, the filler material comprises hollow glass spheres (bubbles) having average particle size ranging of at least 15 microns, or from 20 to 100 microns, or from 40-70 microns, with an average true density of at least 0.30 g/cc, or at least 0.35 g/cc, or at least 0.40 g/cc.

In embodiments, the filler material is present in amount of 1-15 wt. % based on the total weight of the oil gel composition, or from 3-13 wt. %, or from 4-8 wt. %, or at least 3 wt. %.

In embodiments, the filler material is present in 5% to 80% of the oil gel composition, on a volume basis.

Optional Components:

In embodiments, the oil gel composition comprises various other components to modify one or more properties of the oil gel compositions. Examples include one or more antioxidants and other stabilizing ingredients that can be added to protect the oil gel from degradation induced by heat, light, processing conditions, or during storage. Several types of antioxidants can be used, such as primary antioxidants, e.g., hindered phenols, or secondary antioxidants, such as phosphite derivatives, or blends thereof.

In embodiments, the oil gel composition optionally comprises a rheology modifier. Rheology modifiers can be included to meet one or more user or process goals, such as adjusting the flow properties of the oil gel composition. Examples include fumed silica or specialty clays such as attapulgites, or castor oil based thixotropes and the like.

In embodiments, the oil gel composition further comprises other polymers, in particular polyolefins such as polyethylenes and polypropylenes.

The additive components can be present in a total amount ranging from 0.01-5.0 wt. %, alternately from 0.01-0.5 wt. %, based on the total weight of the oil gel composition.

Applications:

The oil gel composition is characterized as being stable and solid, providing a cushioning effect while maintaining a degree of structural stability and support, with a hardness and elasticity as described herein. It can be useful as in molded or extruded applications, e.g., an apparatus or article for bodily support, particularly support that, in addition to being functional, also provides increased comfort and pressure point relief for a user, such as a mattress, a pillow, a mattress topper, a footwear cushion, an arm pad, a wrist or arm rest, a seating apparatus, bedding products, furniture upholstery, pet beds, medical cushioning foams, seat cushions and backs, automotive foam, sports cushioning, transportation cushioning, headrests, arm rests, personal protective equipment, toys, overmolds, and the like.

Properties:

The oil gel composition is characterized by a low peel strength. In embodiments, the oil gel composition has a peel strength of less than 88 N/m (0.5 lbf/in) as measured according to a modified ASTM D 1876 T-Peel test method; or less than 53 N/m (0.3 lbf/in); or less than 35 N/m (0.2 lbf/in); or less than 18 N/m (0.1 lbf/in); or at least 0.17 N/m (0.001 lbf/in).

In embodiments, the oil gel exhibits a hardness in the range of 0-80, or 20-60, or 30-45 Shore OO-10 seconds, measured according to ASTM D 2240.

Articles made from the oil gel composition are characterized as being tack free, e.g., having a peel strength of less than 53 N/m (0.3 lbf/in). By varying the relative amounts of the SEBS copolymer, the mineral oil, tack reducing component, fillers, and the optional additives, the peel strength in the final articles produced can be slightly reduced or greatly reduced.

Methods for Processing the Composition/Forming Articles:

The oil gel composition can be processed to produce articles by using known techniques, such as injection molding, compression molding, rotomolding, thermoforming, casting, extrusion, profile extrusion, and blow molding. In an embodiment, the compositions can be processed using injection molding or extrusion techniques.

The oil gel composition can be processed according to methods known in the art, with the individual components first combined and blended to form a blend.

In embodiments, the major components such as the styrenic block copolymer, mineral oil, glass spheres, optional components are blended together first, with the tack reducing component being added last forming a blend. After mixing, the blend is injected into the mold begins under moderate pressure forming desired shaped articles. In some embodiments, the oil gel composition can be extruded into shaped articles or films.

Articles formed or molded from the oil gel composition having the peel strength of the oil gel composition as specified are characterized as tack free. In molding operations, the oil gel composition does not stick to the mold surface, allowing the article molded therefrom to be released easily or quickly from the mold. As the formed articles are low-tack or tack-free, there is no need for an additional processing step, e.g., the spraying the surface of the mold with a mold release composition, or the subsequent coating of a formed article with a powder or dust to prevent sticking, although either step is optional.

Examples 1-16

The examples are given by way of illustration and are not intended to limit the specification or the claims to follow in any manner.

Compositions comprising the components as listed in Table 1 were prepared by blending and compression molded at 177° C. for 4.5 minutes in to molded plaques measuring 10.16 cm by 10.16 cm by 0.32 cm (4 inches by 4 inches by 0.125 inches). The sample plaques were cut into 2.54 cm (1 inch) wide test strips, and then conditioned by layering one test strip on top of another within shallow metal pans and placing a 562 g weight on top of the stacked specimens. The specimens were put into an oven at 55° C. for 24 hours then were cooled to room temperature (20-25° C.) for 1 hour before removing the weights. The test specimens were placed into a temperature and humidity controlled room overnight prior to testing.

The tack-reducing components are as listed below:

Component SEBS is a selectively hydrogenated styrene-ethylene/butylene-styrene block copolymer commercially available from Kraton Corp. as Kraton E1830.

Component C1 is a non-ionic fatty amide.
Component TA is a siloxane based anti-scratch agent
Component TH is an organo-modified siloxane.
Component T1 is a polyester modified siloxane.
Component C2 is behenamide of vegetable origin.
Component C3 is ethylene-bis-stearamide.
Component S is a fatty stearate salt.
Component MZ1 is a blend of organic fatty acids, esters and.
Component MZ2 is a blend of organic fatty acids, esters and amides.
Component MZ3 is a blend of modified polymers, organic fatty amides and waxes.

The peel strength was measured using the modified ASTM D 1876 T-Peel test method that allowed quantitative values to be obtained for peel strength. A composition whose specimen does not have an average peel strength greater than 53 N/m (0.3 lbf/in) is considered to have met the criteria of an effective composition with reduced tack. The results from the testing are shown in Table 1.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| Composition (wt %) | Ex. 1 | Ex. 2 | Ex. 3 | Ex. 4 | Ex. 5 | Ex. 6 | Ex. 7 | Ex. 8 |
|---|---|---|---|---|---|---|---|---|
| SEBS | 20.20 | 20.00 | 20.00 | 20.00 | 20.00 | 20.00 | 20.00 | 20.00 |
| MineralOil | 74.55 | 73.80 | 73.80 | 73.80 | 73.80 | 73.80 | 73.80 | 73.80 |
| Glass spheres | 5.05 | 5.00 | 5.00 | 5.00 | 5.00 | 5.00 | 5.00 | 5.00 |
| Antioxidant | 0.20 | 0.20 | 0.20 | 0.20 | 0.20 | 0.20 | 0.20 | 0.20 |
| C1 | 0 | — | — | — | — | — | — | — |
| TH | — | 1.00 | — | — | — | — | — | — |
| TA | — | — | 1.00 | — | — | — | — | — |
| T1 | — | — | — | 1.00 | — | — | — | — |
| C2 | — | — | — | — | 1.00 | — | — | — |
| C3 | — | — | — | — | — | 1.00 | — | — |
| S | — | — | — | — | — | — | 1.00 | — |
| MZ1 | — | — | — | — | — | — | — | 1.00 |
| MZ2 | — | — | — | — | — | — | — | — |
| MZ3 | — | — | — | — | — | — | — | — |
| Avg.Peel Strength (lbf/in) | 0.40 | 0.59 | 0.36 | 0.17 | 0.22 | 0.13 | 0.10 | 0.21 |
| AvgPeel Strength (N/m) | 70 | 103 | 63 | 29.8 | 38.5 | 22.8 | 17.5 | 36.8 |
| Composition | Ex. | Ex. | Ex. | Ex. | Ex. | Ex. | Ex. | Ex. |

TABLE 1-continued

| (wt %) | 9 | 10 | 11 | 12 | 13 | 14 | 15 | 16 |
|---|---|---|---|---|---|---|---|---|
| SEBS | 20.00 | 20.00 | 19.61 | 19.61 | 19.61 | 19.61 | 19.61 | 19.61 |
| MineralOil | 73.80 | 73.80 | 72.35 | 72.35 | 72.35 | 72.35 | 72.35 | 72.35 |
| Glass spheres | 5.00 | 5.00 | 4.90 | 4.90 | 4.90 | 4.90 | 4.90 | 4.90 |
| Antioxidant | 0.20 | 0.20 | 0.20 | 0.20 | 0.20 | 0.20 | 0.20 | 0.20 |
| C1 | — | — | 3.00 | — | — | — | — | — |
| TH | — | — | — | — | — | — | — | — |
| TA | — | — | — | — | — | — | — | — |
| T1 | — | — | — | 3.00 | — | — | — | — |
| C2 | — | — | — | — | — | — | — | — |
| C3 | — | — | — | — | — | — | — | — |
| S | — | — | — | — | 3.00 | — | — | — |
| MZ1 | — | — | — | — | — | 3.00 | — | — |
| MZ2 | 1.00 | — | — | — | — | — | 3.00 | — |
| MZ3 | — | 1.00 | — | — | — | — | — | 3.00 |
| Avg.Peel Strength (lbf/in) | 0.13 | 0.04 | 0.19 | 0.12 | 0.12 | 0.18 | 0.12 | 0.06 |
| AvgPeel Strength (N/m) | 22.8 | 7.0 | 33.3 | 21.0 | 21.0 | 31.6 | 21.0 | 10.5 |

The invention claimed is:

1. An article molded from an oil gel composition consisting essentially of:
   10-40 wt. % of a hydrogenated styrenic block copolymer (HSBC), having a general formula of A-B, A-B-A, A-B-A-B, (A-B-A)nX, (A-B)nX, or mixtures thereof, where each A block is a mono alkenyl arene polymer, each B block is a conjugated diene, n is an integer from 2 to 30, and X is a coupling agent residue;
   up to 15 wt. % of a filler;
   at least 50 wt. % of a plasticizer selected from mineral oil, a paraffinic oil, an oil-enriched in paraffin, and mixtures thereof;
   0.25-5 wt. % of a tack reducing component selected from the group of stearic acid, metal stearates, long chain fatty acids, fatty acid salts, fatty acid esters, amide waxes, ethylene-bis-stearamides, erucamide, polyester modified siloxanes, and mixtures thereof, based on the total weight of the oil gel composition;
   wherein the article is molded in a process without additional application of an external mold release surface coating or a powder coating to mold surface, and wherein the oil gel composition does not stick to the mold surface; and
   wherein the article has an average peel strength of less than 53 N/m (0.3 lbf/in) according to modified ASTM D 1876.

2. The article of claim 1, wherein the hydrogenated styrenic block copolymer comprises:
   a tetra-branched block copolymer (IV) having a styrene equivalent peak molecular weight of 100,000 to 800,000 represented by the general formula $(A-B)_4X$;
   a tri-branched block copolymer (III) having a styrene equivalent peak molecular weight of from 75,000 to 600,000 represented by the general formula $(A-B)_3X$;
   a di-branched block copolymer (II) having a styrene equivalent peak molecular weight of from 50,000 to 400,000 represented by the general formula $(A-B)_2X$; and
   a linear diblock copolymer (I) having a styrene equivalent peak molecular weight of from 25,000 to 200,000 represented by the general formula A-B;
   wherein:
   A represents a polymer block of a mono alkenyl arene;
   B represents a polymer block of a conjugated diene selected from the group consisting essentially of butadiene and mixtures of isoprene and butadiene;
   X represents the residue of an alkoxy silane coupling agent having the formula Rx-Si—(OR')y, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and
   wherein the relative amounts of copolymers I, II, III and IV are from 0 to 5 weight percent IV, from 0 to 60 weight percent III, from 40 to 95 weight percent II and from 2 to 10 weight percent 1, where the total of I, II, III and IV equals 100 weight percent.

3. The article of claim 1, wherein the hydrogenated styrenic block copolymer is a styrene-ethylene-butylene-styrene (SEBS) or styrene-ethylene-ethylene-propylene-styrene (SEEPS) block copolymer.

4. The article of claim 1, wherein the article is formed by any of injection molding, compression molding, rotomolding, thermoforming, casting, extrusion, profile extrusion, or blow molding.

5. The article of claim 1, wherein the article is any of a mattress, a pillow, a mattress topper, a footwear cushion, an arm pad, a wrist or arm rest, a seating apparatus, a bedding product, upholstery, a pet bed, a medical cushioning foam, a seat cushion, an automotive foam, a sport cushion, a transportation cushion, a headrest, a personal protective equipment, or a toy.

6. The article of claim 1, wherein the plasticizer is a mineral oil.

7. The article of claim 1, wherein the tack reducing component is selected from stearic acid, fatty stearate salts, and mixtures thereof, and wherein the oil gel composition has an average peel strength of less than 35 N/m (0.2 lbf/in).

8. The article of claim 1, wherein the tack reducing component is polycaprolactone-polydimethysiloxane block copolymer.

9. The article of claim 1, wherein the tack reducing component is a lubricating grease selected from the group of organic fatty acids, esters, amides, and mixtures thereof, and wherein the lubricating grease has a drop melt point of at least 65° C., as defined by ASTM-127.

10. The article of claim 1, wherein the tack reducing component is selected from ethylene-bis-stearamide, erucamide, or mixtures thereof.

11. A method of forming a molded article, the method comprising:
providing an oil gel composition has an average peel strength of less than 53 N/m (0.3 lbf/in) measured according to ASTM D 1876, the oil gel composition consists essentially of
10-40 wt. % of a hydrogenated styrenic block copolymer (HSBC), having a general formula A-B, A-B-A, A-B-A-B, (A-B-A)nX, (A-B)nX, or mixtures thereof, where each A block is a mono alkenyl arene polymer, each B block is a conjugated diene, n is an integer from 2 to 30, and X is a coupling agent residue;
1 to 15 wt. % of glass spheres having an average particle size of at least 15 microns;
at least 50 wt. % of a plasticizer selected from mineral oil, a paraffinic oil, an oil-enriched in paraffin, and mixtures thereof;
0.25-5 wt. % of a tack reducing component selected from the group of stearic acid, metal stearates, long chain fatty acids, fatty acid salts, fatty acid esters, amide waxes, ethylene-bis-stearamides, erucamide, polyester modified siloxanes, and mixtures thereof, based on the total weight of the oil gel composition;
injecting the oil gel composition into a mold to form the molded article without application of any mold release surface coating or a powder coating to mold surface; and wherein the oil gel composition does not stick to the mold surface.

12. The method of claim 11, wherein providing the oil gel composition consists essentially of
forming a mixture with 10-40 wt. % of a hydrogenated styrenic block copolymer (HSBC), having a general formula A-B, A-B-A, A-B-A-B, (A-B-A)nX, (A-B)nX, or mixtures thereof, where each A block is a mono alkenyl arene polymer, each B block is a conjugated diene, n is an integer from 2 to 30, and X is a coupling agent residue;
1 to 15 wt. % of glass spheres having an average particle size of at least 15 microns; and
adding to the mixture
the at least 50 wt. % of a plasticizer selected from mineral oil, a paraffinic oil, an oil-enriched in paraffin, and mixtures thereof, and
the 0.25-5 wt. % of a tack reducing component selected from the group of stearic acid, metal stearates, long chain fatty acids, fatty acid salts, fatty acid esters, amide waxes, ethylene-bis-stearamides, erucamide, polyester modified siloxanes, and mixtures thereof, based on the total weight of the oil gel composition.

13. The method of claim 11, wherein the hydrogenated styrenic block copolymer is a styrene-ethylene-butylene-styrene (SEBS) or styrene-ethylene-ethylene-propylene-styrene (SEEPS) block copolymer.

14. The method of claim 11, wherein the hydrogenated styrenic block copolymer comprises:
a tetra-branched block copolymer (IV) having a styrene equivalent peak molecular weight of 100,000 to 800,000 represented by the general formula $(A-B)_4X$;
a tri-branched block copolymer (III) having a styrene equivalent peak molecular weight of from 75,000 to 600,000 represented by the general formula $(A-B)_3X$;
a di-branched block copolymer (II) having a styrene equivalent peak molecular weight of from 50,000 to 400,000 represented by the general formula $(A-B)_2X$; and
a linear diblock copolymer (I) having a styrene equivalent peak molecular weight of from 25,000 to 200,000 represented by the general formula A-B;
wherein:
A represents a polymer block of a mono alkenyl arene;
B represents a polymer block of a conjugated diene selected from the group consisting essentially of butadiene and mixtures of isoprene and butadiene;
X represents the residue of an alkoxy silane coupling agent having the formula Rx-Si—(OR')y, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and
wherein the relative amounts of copolymers I, II, III and IV are from 0 to 5 weight percent IV, from 0 to 60 weight percent III, from 40 to 95 weight percent II and from 2 to 10 weight percent 1, where the total of I, II, III and IV equals 100 weight percent.

15. The method of claim 11, wherein the molding is any of injection molding, compression molding, rotomolding, or thermoforming.

16. The method of claim 11, wherein the tack reducing component is polycaprolactone-polydimethysiloxane block copolymer.

17. The method of claim 11, wherein the tack reducing component is selected from stearic acid, fatty stearate salts, or mixtures thereof.

18. An article formed by the method of claim 11.

* * * * *